Dec. 3, 1935.  H. M. BIEBEL  2,023,115
RANGE CONTROL SYSTEM
Original Filed March 30, 1934
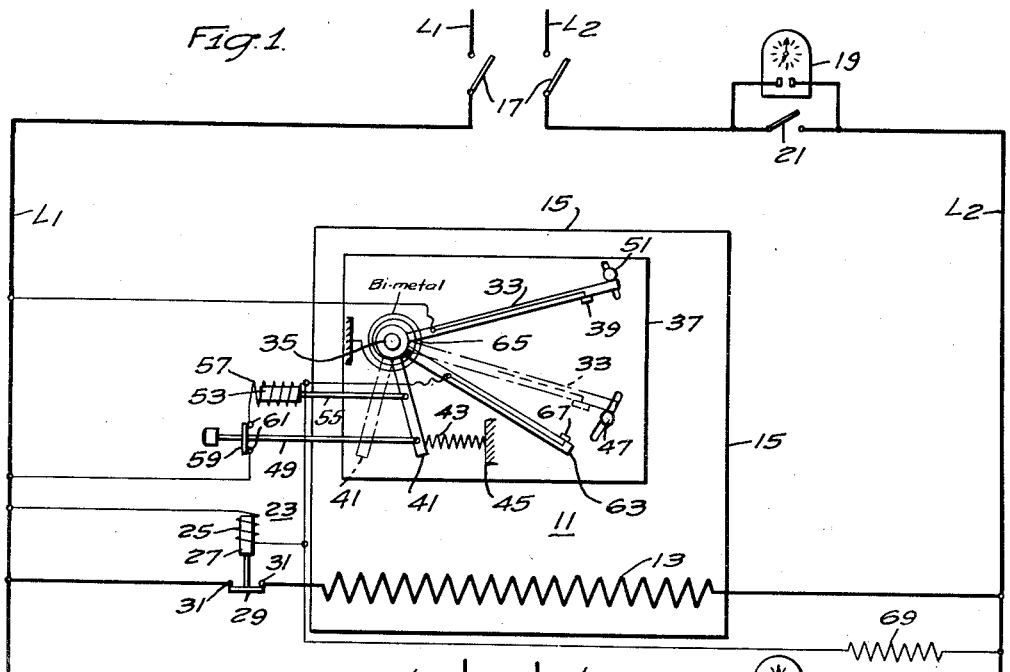
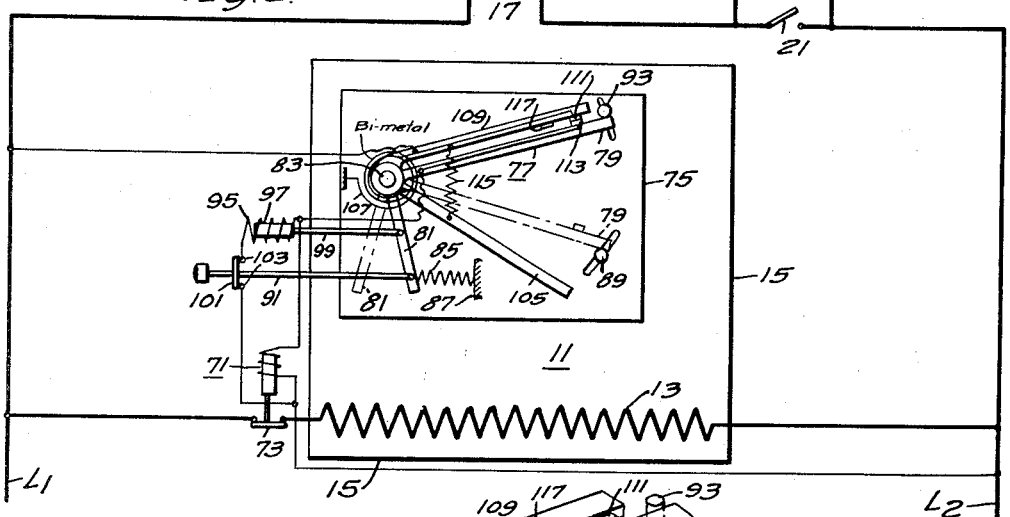
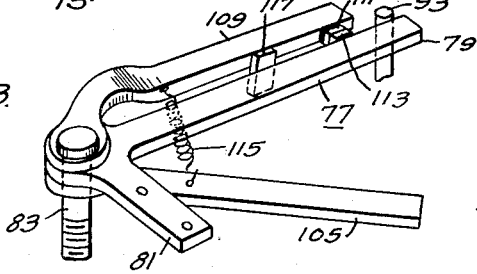
WITNESSES:
E.A. McCloskey
Wm. C. Groome
INVENTOR
Herman M. Biebel.
BY
W. R. Coley
ATTORNEY Patented Dec. 3, 1935

2,023,115

UNITED STATES PATENT OFFICE 2,023,115

RANGE CONTROL SYSTEM

Herman M. Biebel, St. Louis, Mo., assignor to Westinghouse Electric & Manufacturing Company, East Pittsburgh, Pa., a corporation of Pennsylvania Application March 30, 1934, Serial No. 718,274
Renewed July 26, 1935

6 Claims. (Cl. 219—20)

My invention relates to electric ranges and particularly to control systems for range ovens.

An object of my invention is to provide a relatively simple, inexpensive and effective system for controlling the chamber temperature of an electric range.

Another object of my invention is to provide a relatively simple, thermo-electric control system that shall permit of obtaining any one of a plurality of different temperature cycles in the cooking chamber of an electric range at the will of an operator.

Other objects of my invention will either be apparent from the description thereof or will be pointed out hereinafter.

In practicing my invention, I provide in combination with an electrically heated oven of an electric range, a shiftable contact member spring-biased to an initial position, but which may be moved to a second position and held therein by electromagnetic action together with a thermally-actuable contact cooperating with the first contact to provide the desired temperature control of the cooking chamber.

In the accompanying single sheet of drawing:

Figure 1 is a diagrammatic view of a system embodying my invention;

Fig. 2 is a diagrammatic representation of a modified system embodying my invention; and Fig. 3 is a perspective view of the contact members shown schematically only in Fig. 2 of the drawing.

Reference is also made here to my copending applications, relating to similar subject-matter, Serial Nos. 718,272, 718,273, 718,275, 718,276, 718,277, and to an application by F. S. Wheeler, Serial No. 718,278, filed as of even date herewith.

It is well known that in the roasting of meats, it is usually considered desirable to subject the meat initially to a relatively high temperature, which temperature may be maintained for a very short time or even momentarily only, in order that the juices in the meat may be sealed therein by searing of the surface of the roast, after which further operation is effected at a sustained or maintained lower temperature for such a length of time as will provide the desired degree of cooking.

In the ordinary known automatically controlled ranges, either gas or electricity, the initial peak temperature is usually obtained by manual control of the source of heat by the operator, the supply of heat being thereafter reduced to the desired amount at the will of the operator.

My invention contemplates the provision and use of a thermo-electric control system whereby the peak temperature, which may be on the order of 500° F. or over, is maintained momentarily only, the temperature in the cooking chamber thereafter being reduced until it reaches the desired maintained value whereupon the control means is intermittently sequentially energized and deenergized to maintain a substantially constant average value of temperature in the cooking chamber for as long as may be considered necessary or desirable by the operator.

Referring first to Fig. 1 of the drawing, I have there illustrated a cooking chamber 11 having a heating element 13 therein, the cooking chamber being defined by a plurality of walls 15. The details of construction of the heating element 13 and of the walls 15 constitute no part of my present invention, and I contemplate the use of any structures of these details now well known in the art.

A source of supply of electric energy for the heating element 13 may be constituted by supply circuit conductors $L_1$ and $L_2$, a manually actuable switch 17 being provided to permit of applying the voltage of the supply circuit to the system.

As it may be considered desirable to utilize a time-controlled switch to start and stop the operation of the system, I have indicated a time-controlled switch 19 which, however, may be short-circuited by a parallel-connected manual switch 21. These details are also shown schematically only, since such devices are now well known in the art.

Means for controlling the energization of heating element 13 includes a contactor 23, which comprises an actuating coil 25, a movable armature core 27 energized by the coil 25, a contact bridging member 29 operatively associated with core 27 and a plurality of fixed contact members 31 which, together with the bridging members 29, control the energization of heating element 13 from the supply circuit conductors $L_1$ and $L_2$.

Means for controlling the energization of the actuating coil 25 of contactor 23 includes a contact arm 33 which may be of substantially bell-crank shape or of substantially L-shape. The contact arm 33 is pivotally mounted on a pivot pin 35 which may be properly supported upon a base plate 37 which, in turn, is located in the cooking chamber 11 and may be held therein by any suitable or desired means not specifically shown in the drawing. A contact member 39 is suitably mounted on the longer or uppermost of the two arms of bell crank 33; and it is to be understood that it is suitably electrically insulated therefrom if the bell crank 33 is of electric-conducting material or that it may be mounted directly on the longer arm if the bell crank is of electric-insulating material.

The shorter arm 41 of bell-crank lever 33 has operatively associated therewith a compression spring 43, one end of which engages arm 41 and the other end of which engages a fixed abutment 45 whereby bell crank 33 is yieldingly biased to the position shown by the broken lines when the longer arm engages an adjustable stop pin 47 in one position.

Means for moving the bell-crank lever 33 into a second position against the pressure of spring 43 includes a manually adjustable push rod 49 which is suitably supported to permit of its being moved axially. A second adjustable stop pin 51 is provided on base 37 against which the longer arm of bell crank 33 may abut in its uppermost position, and a holding means for latching or locking the bell crank 33 in this second limiting position is also provided. This holding or latching means includes a core member 53 of magnetizable material connected with arm 41 by a rod 55, the armature being energizable by a coil 57 cooperating therewith. A contact bridging member 59 is mounted on push rod 49 and cooperates with a pair of fixed contact members 61 in the circuit of coil 57 to permit energization of coil 57 under certain conditions.

The deenergization of actuating coils 25 and 57 is effected by the cooperation of a contact arm 63, which is movable in accordance with the temperature of the cooking chamber 11 by a thermal element 65 here shown in the form of a bimetal spiral, a contact member 67 being provided on the upper side of thermally-actuable arm 63. Electric connections are provided between the supply circuit conductors, the actuating coils 25 and 57 and the contact members 39 and 67 whereby upon engagement of contact members 67 and 39, both of the actuating coils will be deenergized and a current-limiting resistor 69 is, therefore, provided in this control circuit for the actuating coils to limit the current in the circuit to a certain safe value.

Referring now to Fig. 2 of the drawing, I have there illustrated a modified system also embodying my invention in which deenergization of certain actuating coils is effected by disengagement of cooperating contact members.

The energization of resistor 13 is controlled by a contactor 71 which is of substantially the same type as contactor 23 and which is provided with a contact bridging member 73 which cooperates with fixed contact members to open and close the energizing circuit of heating element 13.

I provide control means for the contactor 71 located in the cooking chamber 11, which control means is mounted on a suitable base 75. A bell-crank lever 77 has a longer arm 79 and a shorter arm 81 and is pivotally mounted on a suitable pivot pin or bolt 83 which is secured on the base plate 75. The shorter arm 81 is engaged by a compression spring 85, one end of which engages a fixed abutment 87 to thereby yieldingly bias bell-crank lever 77 to an initial or lowermost position where arm 79 is in engagement with an adjustable stop pin 89, which stop pin is adjustably mounted upon the base plate 75.

Means for moving bell-crank lever 77 into a second position includes a manually actuable push rod 91 pivotally engaging the shorter arm 81. Guide means for the push rod (not shown) are provided in order to properly support the same and permit axial movement thereof. When push rod 91 is moved against the pressure of spring 85, the longer arm 79 is moved into its uppermost position of engagement with a stop pin 93 which is adjustably mounted on base plate 75.

Means for holding or latching bell-crank lever 77 in its second position comprises an actuating coil 95, and a magnetizable core member 97 cooperating therewith, the core being connected with arm 81 by a rod 99. Means for controlling the circuit of actuating coil 95 includes a contact bridging member 101 properly mounted on push rod 91 and a pair of cooperating fixed contact members 103.

A thermally actuable arm 105 is also pivotally mounted on pivot pin 83 and is moved in accordance with variations in the temperature of the cooking chamber 11 by a bimetal member 107 which is here shown as of spiral shape. A contact arm 109 (see also Fig. 3) having a contact member 111 suitably mounted thereon in a position to cooperate with a contact member 113 on arm 79 is resiliently connected with the thermally-actuable arm 105 by a tension spring 115 extending therebetween. Arm 109 is provided with a depending lug 117 which is of such length as to be engageable by arm 105. Arm 109 is also pivotally mounted on pivot pin 83 and is shown as lying in the same plane as the arms of bell-crank lever 77, while arm 105 is located immediately below bell-crank lever 77.

Referring now to Fig. 1 of the drawing, let it be assumed that an operator wishes to set or manipulate the system to obtain a momentary peak or maximum temperature value in the cooking chamber and thereafter to obtain a sustained or maintained lower temperature value. For illustrative purposes, it may be assumed that the peak temperature is on the order of 500° F. or over, while the maintained temperature is on the order of 300° F. The operator closes switch 17 and properly adjusts the time switch mechanism 19, or if the latter is not desired, closes switch 21. This will provide an energizing circuit for the actuating coil 25 of contactor 23 which may be traced in Fig. 1 of the drawing between the two supply circuit conductors $L_1$ and $L_2$. Contact bridging member 29 will, therefore, be moved into engagement with contact members 31 to thereby close the circuit through heating element 13 and energize the same. It is to be understood that heating element 13 is of sufficient heating capacity to raise the temperature in cooking chamber 11 to the desired high temperature value, irrespective of the amount of food placed therein, within a reasonable length of time.

The operator will, subsequent to closing switches 17 and 21, push on the actuating knob of push rod 49, whereby spring 43 is compressed and the bell-crank lever 33 is moved to the position shown in the full lines in Fig. 1 of the drawing where the longer arm is in engagement with stop pin 51. It has already been stated that this stop pin is adjustable and it is to be understood that the position occupied by contact 39 is such that in cooperation with other parts of the control device, it will be engaged by contact member 67 at the desired peak temperature, which, as was hereinbefore stated, may be considered to be 500° F. The thermally-actuable arm 63 is, of course, initially in a position corresponding to the temperature in the oven chamber which may be assumed to be room temperature. It, however, is moved in a counter-clockwise direction under the influence of the thermal element 65 and at a temperature of substantially 500° F. contact members 67 and 39 will engage each other and thereby deenergize actuating coil 25 by short-circuiting the same. This will result in deenergizing heating element 13 so that the temperature in the cooking chamber 11 will be reduced at a rate commensurate with the design constants of the oven walls 15 of the heating element 13 and also in accordance with the amount of food located in the cooking chamber 11.

At the same time that push rod 49 was actuated to move bell-crank lever 33 to its peak temperature position, an energizing circuit was closed through coil 57 of the electromagnetic holding or latching means, by reason of the engagement of contact bridging member 59 with contacts 61. The use of this electromagnetic means insures that, so long as coil 57 was energized, bell-crank lever 33 will remain in its manually shifted position as has been hereinbefore described.

However, when contact members 67 and 39 are engaged with each other, the actuating or energizing coil 57 is also short circuited as was hereinbefore set forth for actuating coil 25. The electromagnetic latching or holding means is, therefore, rendered inoperative so that spring 43 will immediately cause a turning movement of bell-crank lever 33 in a clockwise direction until the longer arm of bell-crank lever 33 engages lower stop pin 47, the strength of spring 43 being such as to overcome the pressure of spiral 65.

It is to be understood that the adjustable stop pin 47 has been so located on base 37 that it is in the selected sustained or maintained temperature position.

When the longer arm and particularly the contact member 39 on bell-crank lever 33 has been moved to this maintained temperature position, the thermally-actuable arm 63 has also been moved to that position since it and the longer arm of bell-crank lever 33 are located in the same plane. The short-circuit existing on or across coils 25 and 57 will, therefore, be maintained and it is to be further noted that the holding or energizing circuit of coil 57 is now open, since contact bridging member 59 has been moved out of engagement with contact members 61.

Because of the deenergization of heating element 13, the temperature in cooking chamber 11 will gradually decrease, as was hereinbefore set forth, and at a lower temperature which, for illustrative purposes, may be considered to be 300° F. contact 67 is disengaged from contact member 39 so that actuating coil 25 is immediately reenergized, whereby heating element 13 is also reenergized. It is to be noted, however, that coil 57 is not reenergized since its circuit has been interrupted in the manner hereinbefore set forth.

The temperature in cooking chamber 11 will, therefore, again be increased until the two contact members 67 and 39 are again moved into engagement whereupon the heating element is deenergized. This cycle of intermittent sequential energization and deenergization of the coil of contactor 23 and, therefore, of the heating element, continues until such time as the system is deenergized either manually by the operator or automatically by the time-controlled device 19, to maintain a lower average value of temperature in the cooking chamber.

Referring now to Fig. 2 of the drawing, the operation of the system there shown is substantially the same as has already been set forth in connection with the system of Fig. 1 of the drawing, the only difference being that energization of the actuating coil of contactor 71 and of actuating coil 95 is effected by the engagement of the contact members on arm 109 and on arm 79. As soon as the thermally-actuable arm 105 is moved by the thermal element 107, so that it engages lug 117 and moves arm 109 in a counter-clockwise direction, contact members 111 and 113 will be moved out of engagement to thereby deenergize the contactor coil 71 and the coil 95 of the electromagnetic holding or latching means.

The same cycle of operation as was hereinbefore set forth for the system of Fig. 1 of the drawing will be effected by the system shown in Fig. 2 of the drawing, and further detailed description thereof is, therefore, believed to be unnecessary.

If the operator does not desire the momentary peak temperature and then a maintained temperature cycle, but desires a maintained temperature cycle only in the cooking chamber, it is only necessary that the switches 17 and 21 (or the time device 19) be properly actuated, but, in this case, push rod 49 or 91 will not be actuated manually. The respective bell-crank levers and the contact member thereon will, therefore, remain in the maintained temperature position where they are in engagement with the stop pins 47 and 89, respectively. As soon as the temperature in the cooking chamber or, for that matter, of the thermal element itself has reached a certain value, the energizing circuit of the contactor alone will be either interrupted or the coil will be short-circuited, as the case may be, to thereby deenergize heating element 13. The temperature in the cooking chamber will thereafter drop until such time as the contactor is reenergized, and this operation continues to maintain a substantially constant average value of temperature in the cooking chamber, this value being determined by the position of either of the stop pins 47 or 89, the maximum and minimum temperature values being dependent upon the adjustment of the thermal control means.

The device embodying my invention thus includes a thermo-electric control system to permit of obtaining either one of a plurality of temperature cycles in the cooking chambers of an electric range, the control elements being relatively simple, inexpensive, easily manufactured and installed and also very easily operated by an operator.

Various further modifications may be made in the device embodying my invention without departing from the spirit and scope thereof, and I desire, therefore, that only such limitations shall be placed thereon as are imposed by the prior art or are set forth in the appended claims.

I claim as my invention:

1. In an electric cooking appliance including a cooking chamber and a heating element therefor, a contactor controlling the heating element, a contact biased to a maintained-temperature position, means for moving the biased contact to a peak temperature position and for latching it in such position, a thermally-actuable contact responsive to chamber temperature, and electric connections between the contactor coil, the contacts and the latching means, said thermally-actuable contact cooperating with the biased contact when in its peak temperature position to effect deenergization of the contactor coil, of the heating element and of the latching means to return the biased contact to its maintained temperature position and to thereafter cooperate with said biased contact in its maintained-temperature position to intermittently sequentially energize and deenergize the contactor coil and the heating element.

2. In an electric cooking appliance including a cooking chamber and a heating element therefor, a contactor controlling the heating element, a contact biased to a maintained-temperature position, manual means for moving the biased contact to a peak temperature position, an electromagnetic latch for holding the biased contact in the peak temperature position, a thermally-actuable contact responsive to chamber temperature, and electric connections between the two contacts, the contactor coil and the electromagnetic latch, whereby the thermally-actuable contact cooperates with the biased contact when the latter is in its peak temperature position to effect deenergization of the contactor coil and of the electromagnetic latch, whereby the heating element is deenergized and the biased contact is returned to its maintained-temperature position, the two contacts thereafter cooperating with each other to intermittently sequentially energize and deenergize the contactor coil and the heating element at a lower maintained temperature in the cooking chamber.

3. In an electric cooking appliance including a cooking chamber, a heating element therefor and means for controlling the heating element to obtain a momentary peak temperature and then a lower maintained temperature in the cooking chamber, said means comprising a contact member having two stable positions, spring means to bias the contact member to one position, manual means to move it to the other position, an electromagnet to hold it in the other position, a thermally-actuable contact responsive to chamber temperature, a contactor controlling the energization of the heating element and electric connections between the contact member, the thermally-actuable contact and the coils of the contactor and of the electromagnet whereby when the contact member is moved manually to its second position it is held therein by the electromagnet, the thermally-actuable contact member cooperating with the contact member to effect deenergization of the contactor coil and of the electromagnet coil at a certain peak temperature whereby to deenergize the heating element and effect return of the two position contact member to its first position and thereafter cooperating with the contact member in its first position to intermittently energize and deenergize the contactor to maintain a different lower temperature in the cooking chamber.

4. In an electric cooking appliance including a cooking chamber, a heating element therefor, and means for controlling the heating element to obtain a momentary peak temperature and then a lower maintained temperature in the cooking chamber, said means comprising a two-position contact spring-biased to a first position corresponding to a lower maintained temperature in the cooking chamber, means for moving it into and holding it in a second position corresponding to a peak temperature, a thermally-actuable contact movable in accordance with chamber temperature, a contactor controlling the energization of the heating element and electric connections between the contactor coil, the contacts and the holding means whereby initial cooperation of the two contacts relative to each other effects deenergization of the contactor and of the holding means at the peak temperature, thereby effecting deenergization of the heating element and the return of the two-position contact to its first position, further cooperative relative movements of the two contacts effecting intermittent sequential energization and deenergization of the contactor coil and of the heating element at the lower maintained chamber temperature.

5. In an electric cooking appliance including a cooking chamber, an electric heating element therefor and means for selectively obtaining one or the other of two different temperature cycles in the cooking chamber, said means comprising a contactor controlling the energization of the heating element, a two-position contact spring-biased to a first position corresponding to a lower cooking chamber temperature, manual means for moving the contact to a second position corresponding to a peak chamber temperature, electric means holding the contact in its second position, means associated with said manual contact-moving means to render the electric holding means effective and ineffective, a second contact movable in response to variations in chamber temperature, and electric connections between the contactor coil, the two contacts, the electric holding means and the means rendering the holding means effective and ineffective whereby upon moving the two-position contact to its second position, the electric holding means is rendered effective to hold said contact in its peak-temperature position, the two contacts cooperating with each other to effect deenergization of the contactor and of the electric holding means at the peak temperature, thereby effecting deenergization of the heating element and return of the two-position contact to its first position, further cooperation of the two contacts effecting intermittent sequential energization and deenergization of the contactor and the heating element to maintain a lower temperature in the cooking chamber, and whereby if the two-position contact remains in its first position the two contacts cooperate with each other to intermittently sequentially energize and deenergize the contactor and the heating element to maintain said lower temperature in the cooking chamber.

6. An appliance as set forth in claim 5, in which the means rendering the electric holding means effective and ineffective is a switch in the circuit of the electric holding means mounted on the manual contact-moving means and actuated therewith.

HERMAN M. BIEBEL.